US012807081B2

(12) United States Patent
Rupp

(10) Patent No.: US 12,807,081 B2
(45) Date of Patent: Nov. 24, 2026

(54) VEHICLE INCLUDING GARNISH ASSEMBLY WRAPPING AROUND A-PILLAR AND METHOD OF ASSEMBLING SAME

(71) Applicant: Honda Motor Co., Ltd., Tokyo (JP)

(72) Inventor: Timothy J. Rupp, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 408 days.

(21) Appl. No.: 18/525,936

(22) Filed: Dec. 1, 2023

(65) Prior Publication Data

US 2025/0178545 A1 Jun. 5, 2025

(51) Int. Cl.

*B60R 13/04* (2006.01)
*B60J 1/02* (2006.01)
*B62D 25/04* (2006.01)

(52) U.S. Cl.

CPC ................. *B60R 13/04* (2013.01); *B60J 1/02* (2013.01); *B62D 25/04* (2013.01)

(58) Field of Classification Search

CPC ... B60R 13/04; B60R 13/0206; B60R 13/025; B60R 13/06; B60R 21/213; B60R 2011/0022; B60J 1/02; B62D 25/04
USPC .......................................................... 296/191
See application file for complete search history.

(56) References Cited

U.S. PATENT DOCUMENTS

| | | | | |
|---|---|---|---|---|
| 6,152,485 | A | 11/2000 | Kato | |
| 7,651,158 | B2 * | 1/2010 | Koizumi ................ | B62D 25/16 296/191 |
| 8,348,321 | B2 | 1/2013 | Yamazaki et al. | |

FOREIGN PATENT DOCUMENTS

| | | | |
|---|---|---|---|
| CN | 111645760 | A | 9/2020 |
| CN | 217945098 | U | 12/2022 |
| CN | 116639058 | A | 8/2023 |
| EP | 1599376 | B1 | 8/2006 |
| JP | 2005125946 | A | 5/2005 |
| JP | 3784716 | B2 | 6/2006 |
| JP | 4374385 | B2 | 12/2009 |
| JP | 4434893 | B2 | 3/2010 |

OTHER PUBLICATIONS

New Land Rover Defender L663 Removing Windscreen A pillars; youtube.com; youtube.com/watch?v=JfR8pW2T494; Powerfulukltd; accessed Mar. 11, 2026; published Jun. 18, 2020 (Year: 2020).*

2018 Toyota CHR C-HR—Quick Look at the R-Code Paint Treatment; youtube.com; youtube.com/watch?v=g3G70Q3KN7E; MikesCarInfo; accessed Mar. 12, 2026; published May 18, 2017 (Year: 2017).*

* cited by examiner

*Primary Examiner* — Amy R Weisberg
*Assistant Examiner* — Philip C Adams
(74) *Attorney, Agent, or Firm* — KENEALY VAIDYA LLP

(57) ABSTRACT

A vehicle can include a windshield, an A-pillar, a body panel, an A-pillar garnish, a front pillar corner garnish, and a connection structure. The A-pillar can be adjacent to the windshield, and the body panel can be adjacent to the A-pillar. The A-pillar garnish can be mounted onto and cover at least a portion of the A-pillar. The A-pillar garnish can include a lower end that is adjacent to the body panel and the front pillar corner garnish can cover at least a portion of the lower end. The connection structure can connect the front pillar corner garnish to the A-pillar.

20 Claims, 4 Drawing Sheets

VEHICLE INCLUDING GARNISH ASSEMBLY WRAPPING AROUND A-PILLAR AND METHOD OF ASSEMBLING SAME

BACKGROUND

The disclosed subject matter relates to a vehicle that includes an A-pillar and a garnish assembly mounted onto the A-pillar. More particularly, the disclosed subject matter relates to methods and apparatus for mounting the garnish assembly to the A-pillar and covering or concealing the connection(s) between the garnish assembly and the A-pillar.

A vehicle can include a main frame, a plurality of pillars, a roof and a windshield. The pillars can be connected to the main frame and spaced along the main frame in a longitudinal direction of the vehicle. The pillars can be arranged in pairs and support the roof above the frame. The pillars of each pair can be spaced apart in a transverse direction of the vehicle. A first pair of the pillars can be referred to as A-pillars. Each of the A-pillars can be near the front of the vehicle and can extend along either side of and support the windshield. A door of the vehicle can be supported on the A-pillar by at least one hinge.

The vehicle can include decorative panels that are mounted onto the door or other part(s) of the vehicle such as, but not limited to the pillars, a bumper, a fender, or a trunk lid. These decorative panels can contribute to the aesthetic appearance of the vehicle. The decorative panel can include an exterior surface that forms a portion of the exterior surface of the vehicle. The exterior surface of the decorative panel can have a color that is the same as the overall color of the vehicle or a color that is complimentary to the overall color of the vehicle. The exterior surface of the decorative panel can have a texture that is the same as or different from the texture of another portion of the exterior surface of the vehicle.

SUMMARY

Some embodiments are directed to a vehicle that can include a windshield, an A-pillar, a body panel, an A-pillar garnish, a front pillar corner garnish, and a connection structure. The A-pillar can be adjacent to the windshield, and the body panel can be adjacent to the A-pillar. The A-pillar garnish can be mounted onto and cover at least a portion of the A-pillar. The A-pillar garnish can include a lower end that is adjacent to the body panel and the front pillar corner garnish can cover at least a portion of the lower end. The connection structure can connect the front pillar corner garnish to the A-pillar.

Some embodiments are directed to a method for assembling a vehicle of claim that can include: fitting an A-pillar garnish onto an A-pillar of the vehicle; bolting the lower end of the A-pillar garnish to the A-pillar; fitting the front pillar corner garnish onto the A-pillar and the A-pillar garnish; and fastening the first connection structure from a side of the A-pillar that is adjacent to the windshield.

Some embodiments are directed to a vehicle that can include an A-pillar, a windshield, a door, a body panel, an A-pillar garnish, a front pillar corner garnish, and connection structure. The windshield can be mounted onto the A-pillar and the door can be pivotally mounted onto the A-pillar. The body panel can be adjacent to the A-pillar. The A-pillar garnish can be mounted onto and cover at least a portion of the A-pillar and can include a lower end that is adjacent to the body panel. The front pillar corner garnish can cover at least a portion of the lower end. The connection structure can connect the front pillar corner garnish to the A-pillar.

Some embodiments are directed to a vehicle that can include an A-pillar, a windshield, a body panel, an A-pillar garnish, a front pillar corner garnish, and a connection structure. The A-pillar can include an inboard side and the windshield can be adjacent the inboard side of the A-pillar. The body panel can be adjacent to the A-pillar. The A-pillar garnish can be mounted onto and cover at least a portion of the A-pillar. The A-pillar garnish can include a main body and a mounting member protruding from the main body. The main body can include a first exterior surface that is spaced away from the body panel by a gap and the mounting member can be recessed inwardly from the first exterior surface. The front pillar corner garnish can cover the gap and at least a portion of the mounting member. The front pillar corner garnish can include a second exterior surface that is flush with the first exterior surface. The connection structure can connect the front pillar corner garnish to the A-pillar and extend through the inboard side of the A-pillar.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Figure 1:
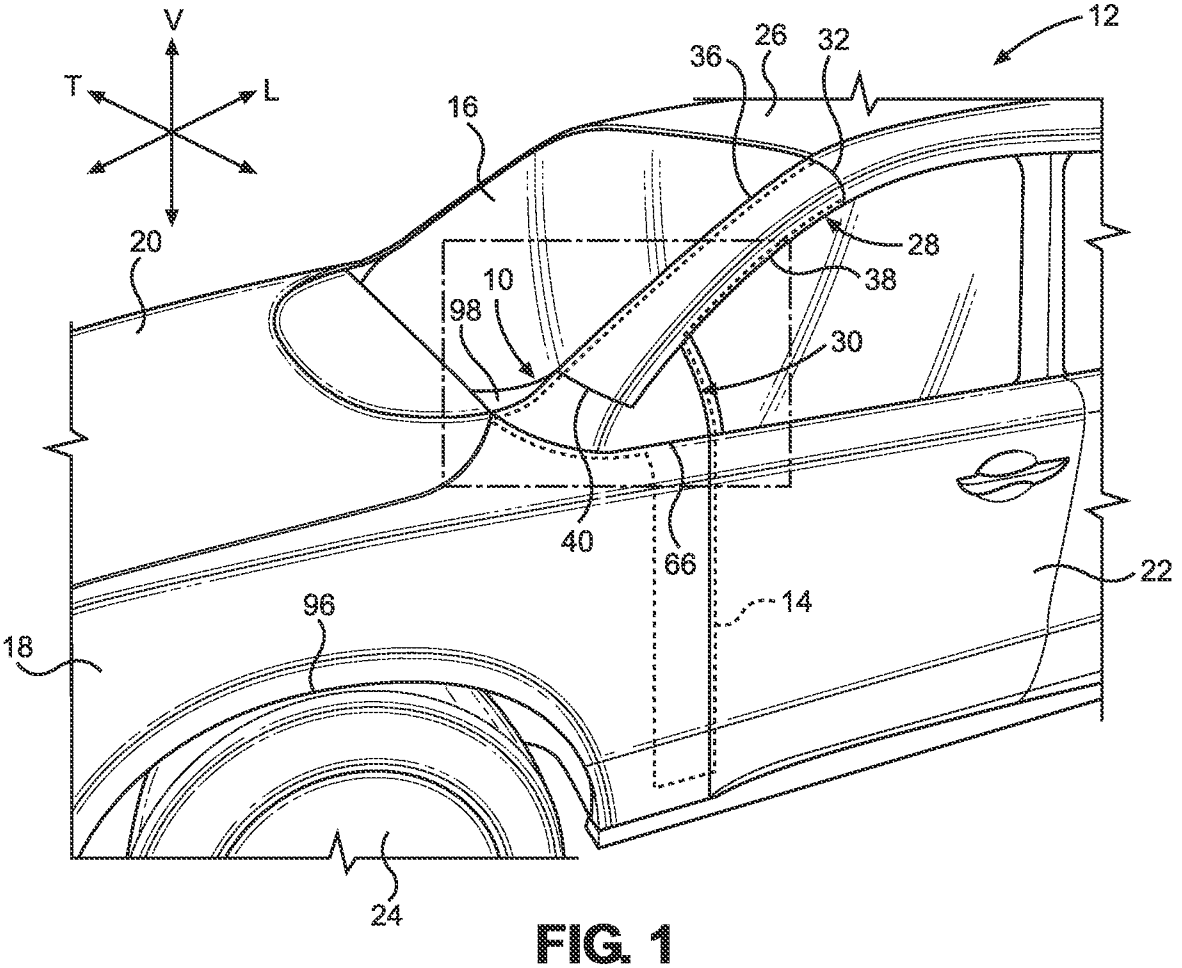
FIG. 1 is a perspective view of a front portion of a vehicle that includes a wrap-around pillar garnish assembly made in accordance with principles of the disclosed subject matter.

FIG. 1 illustrates an embodiment of a wrap-around garnish assembly 10 for a vehicle 12 made in accordance with principles of the disclosed subject matter. The vehicle 12 can include an A-pillar 14, a windshield 16, a front fender 18, a hood 20, a door 22, a front wheel 24 and a roof 26. Each of the front fender 18 and the hood 20 can be referred to as a body panel.

The A-pillar 14 can be concealed by the wrap-around garnish assembly 10 and the front fender 18. The A-pillar 14 is shown schematically and in phantom in FIG. 1. The A-pillar 14 can extend from the roof 26 to a main frame under the floor of the vehicle 12. The main frame is obstructed from view and omitted from FIG. 1 for clarity and simplicity of the drawing. The A-pillar 14 can support the roof 26 above the main frame. The front pillar corner garnish 28 could instead be used with a typical side panel outer (SPO) instead or in addition to at the A-Pillar 14. The front pillar corner garnish 28 could also be used in applications where styling line or appearance continuation is desired, even at locations away from the A-Pillar 14.

The windshield 16, the front fender 18 and the door 22 can be adjacent to the A-pillar 14, and the windshield 16 and the door 22 can be mounted onto the A-pillar 14. The door 22 can be connected to one or more hinges that are mounted onto the A-pillar 14 so that the door 22 can pivot relative to the A-pillar 14. The front fender 18 can include a wheel arch 96 that extends along the front wheel 24.

The A-pillar 14 has an exterior surface that, in the exemplary embodiment, does not form a portion of the exterior surface of the vehicle 12. Instead, the A-pillar garnish 28 can include an exterior surface 46 that forms a portion of the exterior surface of the vehicle 12 and provide an aesthetic appearance for the vehicle 12 that is different from that without the A-pillar garnish 28. For example, the A-pillar garnish 28 can be of a color and/or texture that is different from another portion of the exterior surface of the vehicle 12.

Figure 9:
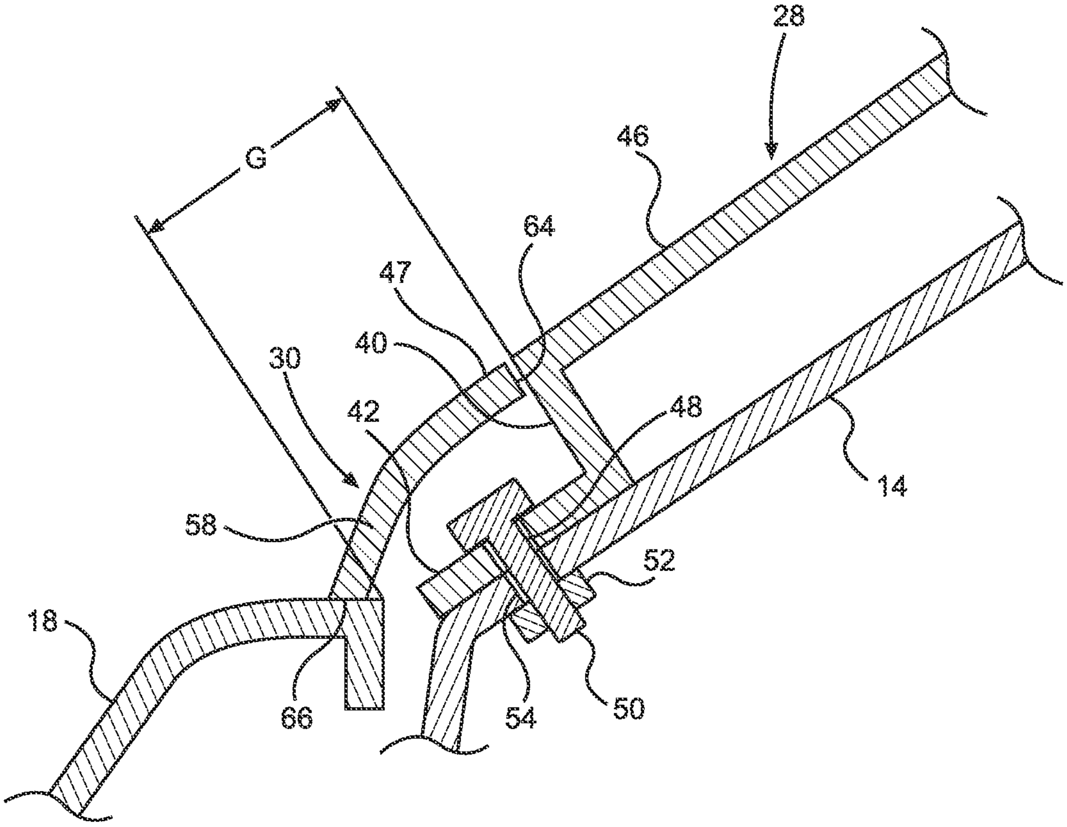
FIG. 9 is a cross-sectional view taken along line 9-9 of FIG. 2.

Referring to FIG. 9, a gap G can separate an exterior surface 46 of the A-pillar garnish 28 from the front fender 18. A relatively large gap G between the A-pillar garnish 28 and the front fender 18 can facilitate assembly of the A-pillar garnish 28 onto the A-pillar 14 because a tool and/or a workers hand can easily fit into the gap G and the location for connecting the A-pillar garnish 28 to the A-pillar 14 can be easily visualized. However, an observer of the completed vehicle 12 can negatively perceive the relatively large gap G as low build quality and/or an undesirable aesthetic appearance.

In contrast, a relatively small gap G can promote a positive perception of the build quality and the aesthetic appearance. However, a relatively small gap G can adversely affect the ease by which the A-pillar garnish 28 can be assembled onto the A-pillar 14. As a result, one or more assembly tasks for mounting the A-pillar garnish 28 onto the A-pillar 14 can be time-consuming and/or physically challenging and/or result in an inaccurate or incomplete connection between the A-pillar garnish 28 and the A-pillar 14.

Whether large or small, the presence of the gap G, can create undesirable wind noise when the vehicle 12 is travelling.

Thus, it can be advantageous to configure the wrap-around garnish assembly 10 to facilitate assembly onto the vehicle 12, avoid the negative appearance caused by a relatively large gap G and improve wind noise performance.

Figure 2:
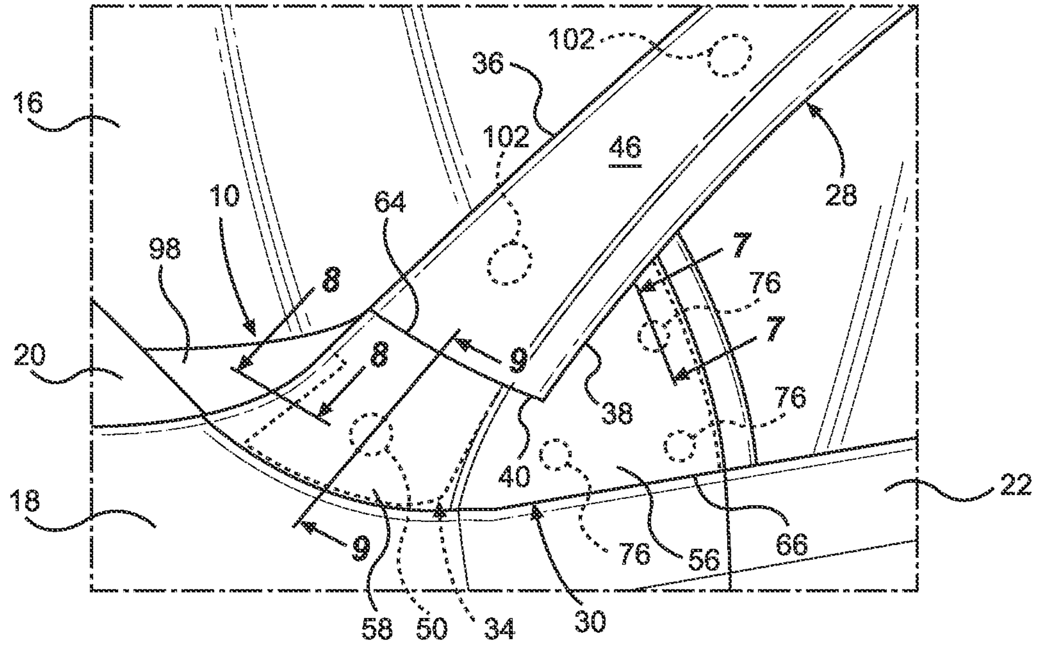
FIG. 2 is an enlarged view of a portion of FIG. 1.

Referring to FIGS. 1 and 2, the wrap-around garnish assembly 10 can include the A-pillar garnish 28 and a front pillar corner garnish 30. The A-pillar garnish 28 can cover or conceal most of the portion of the A-pillar 14 that extends along the windshield 16. The front pillar corner garnish 30 can cover or conceal a lower end 34 of the A-pillar garnish 28, a front portion of the A-pillar 14 that is between the A-pillar garnish 28 and the front fender 18, and a side portion of the A-pillar 14. The A-pillar garnish 28 and the front pillar corner garnish 30 can be made from any appropriate material such as, but not limited to plastic, chrome plated plastic, carbon fiber, fiberglass, fiber-reinforced plastic, sheet molding compound, aluminum, aluminum alloy, steel, stainless steel, or chrome-plated steel. The A-pillar garnish 28 and the front pillar corner garnish 30 can be painted the same color as the exterior of the vehicle 12, or a color that is complementary to the exterior color of the vehicle 12, or unpainted, or painted with a clear coat on the natural exterior surface of the garnishes 28, 30, or chrome plated, or anodized. Each of the garnishes 28, 30 can be referred to as a decorative panel, a trim panel, an exterior panel, a pillar panel, a body panel, a body cladding or a pillar cladding.

Returning to FIGS. 5 and 9, the front pillar corner garnish 30 can include an exterior surface 47. The exterior surface 47 can form a portion of the exterior surface of the vehicle 12. Referring to FIG. 9, the exterior surface 47 can be flush or substantially flush with the exterior surface 46 of the A-pillar garnish 28 such that an observer of the exterior surfaces 46, 47 would believe that these surfaces appear flush with each other. Either or both of the exterior surfaces 46, 47 can have a texture that is the same as or different from the texture of the exterior surface of any of the front fender 18, the hood 20 and the door 22 or each other.

Figure 3:
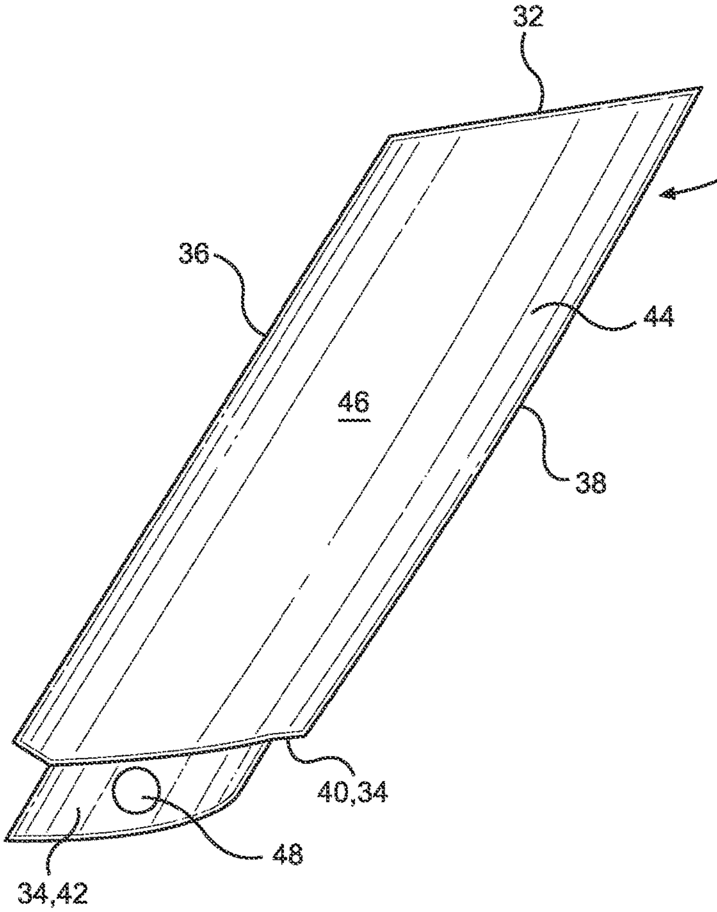
FIG. 3 is a perspective view of an A-pillar garnish of the wrap-around garnish assembly of FIG. 1.
Figure 4:
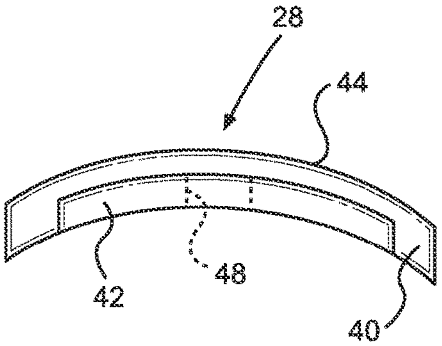
FIG. 4 is an end view of the A-pillar garnish of FIG. 3.

Referring to FIG. 3, the A-pillar garnish 28 can include an upper side 32, a lower end 34, a first side 36 and a second side 38. The upper side 32 can be adjacent to the roof 26 and the upper side of the windshield 16. The lower end 34 can be adjacent to the front fender 18, the hood 20 and the lower side of the windshield 16. The first side 36 can extend along the windshield 16 and the second side 38 can extend along the door 22. The A-pillar garnish 28 can be elongated generally along the longitudinal direction L of the vehicle 12 such that a length measured from the lower end 34 to the upper side 32 is greater than a dimension measured from the first side 36 to the second side 38.

The lower end 34 can include a lower side 40 and a mounting member 42.

The A-pillar garnish 28 can include a main body 44 that is bound by the lower side 40, the upper end 32 and the sides 36, 38. The main body 44 can include the exterior surface 46. The lower side 40 can be an end surface of the main body 44.

The mounting member 42 can protrude away from the main body 44 and the lower side 40. The mounting member 42 can be recessed inwardly from the exterior surface 46 of the A-pillar garnish 28.

The A-pillar garnish 28 can include a bolt hole 48 extending through the mounting member 42. Returning to FIG. 9, the A-pillar 14 can include a first bolt hole 54. A bolt 50 can extend through the bolt holes 48, 54 and be threaded into a nut 52 to connect the A-pillar garnish 28 to the A-pillar 14. FIG. 2 schematically illustrates the bolt 50 in phantom. The nut 52 can be welded onto the A-pillar 14 to facilitate tightening of the bolt 50 against the mounting member 42. Use of a bolt 50 to attach at the bottom of the A-pillar garnish 28 provides a secure connection between the structures especially during operation at a front of the vehicle.

The mounting member 42 can facilitate assembly of the A-pillar garnish 28 onto the A-pillar 14 by protruding from the lower side 40 of the A-pillar garnish 28 and toward the front fender 18. The mounting member 42 can create the gap G between the lower side 40 and the front fender 18. The gap G can be large enough to easily insert the bolt 50 and a wrench into the gap G to tighten the bolt 50. The front pillar garnish 30 can advantageously cover or conceal the gap G. Thus, the wrap-around garnish assembly 10 can facilitate the assembly process for the vehicle 12 without adversely impacting the perceived build quality and/or aesthetic appearance of the vehicle 12.

Figure 5:
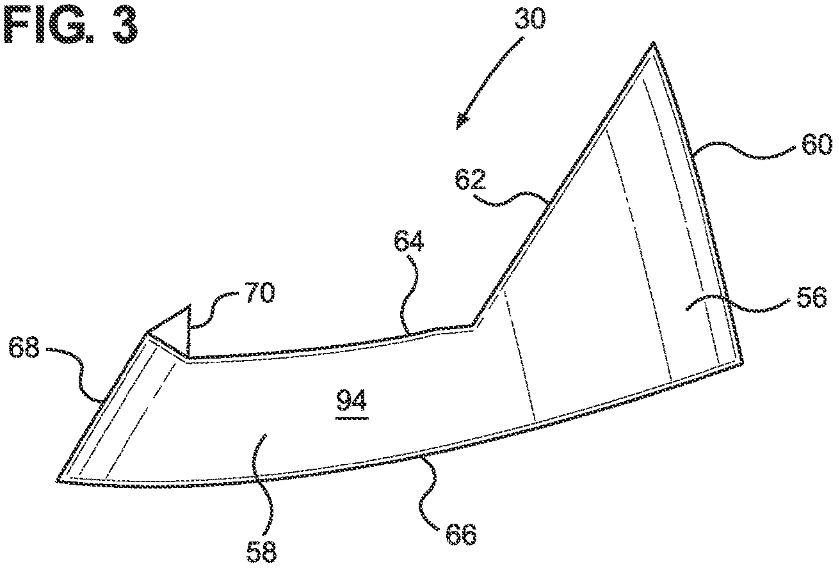
FIG. 5 is a perspective view of a front pillar corner garnish of the wrap-around garnish assembly of FIG. 1.

Referring to FIGS. 2 and 5, the front pillar corner garnish 30 can include a side panel 56 and an extension panel 58. The side panel 56 can cover or conceal a side portion of the A-pillar 14 that extends from the A-pillar garnish 28 to the front fender 18 along the vertical direction V of the vehicle 12. The extension panel 58 can cover or conceal a different portion of the A-pillar 14 that extends from the A-pillar garnish 28 to the front fender 18 and can cover or conceal the lower end 34 of the A-pillar garnish 28. Referring to FIG. 9, the extension panel 58 can cover or conceal the gap G between the front fender 18 and the A-pillar garnish 28.

Returning to FIGS. 2 and 5, the side panel 56 can be located on a side of the vehicle 12 and can extend along the longitudinal direction L and the vertical direction V of the vehicle 12. The side panel 56 can be adjacent to the second side 38 of the A-pillar garnish 28. The extension panel 58 can extend from the side panel 56 to the windshield 16 and cover the lower end 34 of the A-pillar garnish 28. The extension panel 58 can be curved toward the transverse direction T as it extends from the side panel 56 to the windshield 16. The relative orientations of the side panel 56 and the extension panel 58 can provide an appearance of the front pillar corner garnish 30 wrapping around the A-pillar 14.

The A-pillar garnish 28 can be between the side panel 56 and the windshield 16. The side panel 56 can be located between the door 22 and the A-pillar garnish 28 in a longitudinal direction L of the vehicle 12. The side panel 56 can extend along the front fender 18 in the longitudinal direction L. The extension panel 58 can be adjacent to the windshield 16 and extend along the front fender 18 in the transverse direction T of the vehicle 12.

Referring to FIG. 5, the front pillar corner garnish 30 can include a first side 60, a second side 62, a third side 64, a fourth side 66 and a fifth side 68.

The first side 60 can extend along the side panel 56 and form a boundary of the side panel 56 in the longitudinal direction L of the vehicle 12. The first side 60 can extend along the door 22.

The second side 62 can extend along the side panel 56 and form a boundary of the side panel 56 in the vertical direction V of the vehicle 12. The second side 62 can extend from the first side 60 and be inclined with respect to the longitudinal direction L and the vertical direction V of the vehicle 12. The second side 62 can extend along the second side 38 of the A-pillar garnish 28.

The third side 64 can extend along the extension panel 58 and form a boundary of the extension panel 58 in the vertical direction V. The third side 64 can extend from and between the second side 62 and the fifth side 68. The third side 64 can be curved toward the transverse direction T of the vehicle 12. The third side 64 can extend along the lower side 40 of the A-pillar garnish 28.

The fourth side 66 can extend along both of the side panel 56 and the extension panel 58 and form a boundary of the panels 56, 58 in the vertical direction V of the vehicle 12. The fourth side 66 can extend from and between the first side 60 and the fifth side 68. A portion of the fourth side 66 on the side panel 56 can extend along the longitudinal direction L of the vehicle 12 and a portion of the fourth side 66 on the extension panel 58 can be curved toward the transverse direction T of the vehicle 12. The fourth side 66 can be adjacent to and extend along the front fender 18.

The fifth side 68 can extend along the extension panel 58 and form a boundary of the extension panel 58 in the transverse direction T of the vehicle 12. The fifth side 68 can be inclined with respect to the longitudinal direction L and the vertical direction V of the vehicle 12. The fifth side 68 can extend from and between the third side 64 and the fourth side 66.

Figure 6:
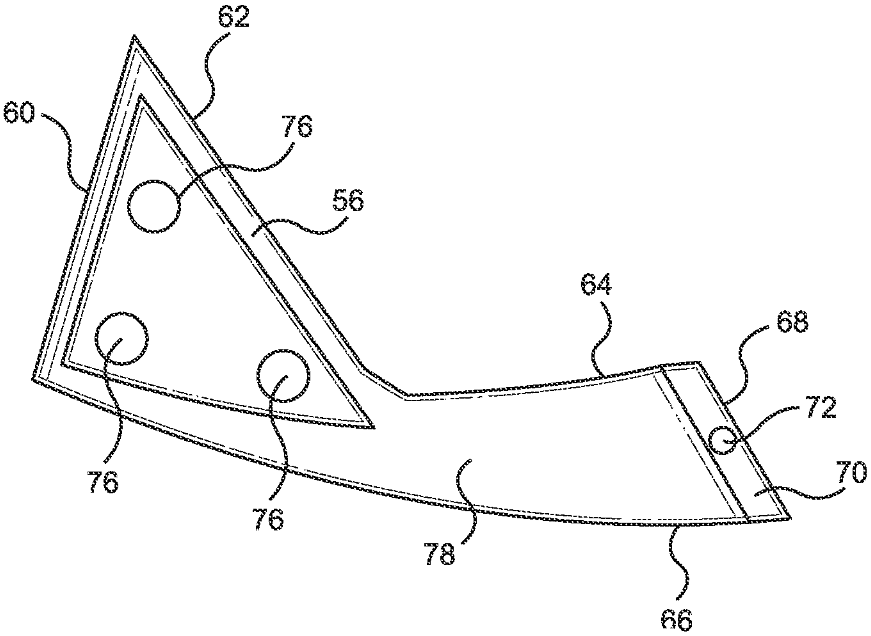
FIG. 6 is rear view of the front pillar corner garnish of FIG. 5.
Figure 8:
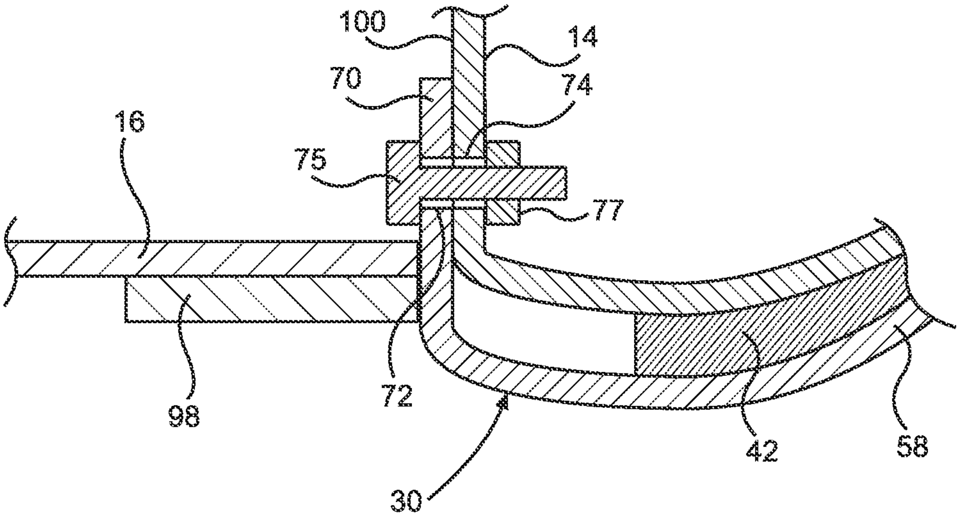
FIG. 8 is a cross-sectional view taken along line 8-8 of FIG. 2.

Referring to FIGS. 5, 6 and 8, the front pillar corner garnish 30 can include a flange 70 and a bolt hole 72. The flange 70 can protrude from the fifth side 68 in the longitudinal direction L of the vehicle 12. The flange 70 can form an end of the extension panel 58. The bolt hole 72 can extend through the flange 70. Alternatively, a factory member assembled clip can be used for connection of the corner garnish 30 to the A-pillar 14.

Referring to FIG. 8, the A-pillar 14 can include a second bolt hole 74. A bolt 75 can extend through the bolt holes 72, 74 and be threaded into a nut 77 to connect the front pillar corner garnish 30 to the A-pillar 14. The nut 77 can be welded to the A-pillar 14 to facilitate tightening of the bolt against the flange 70. This can also be done using a captured nut. The captured nut could be assembled to a dog house, similar to how typical factory clips are assembled to dog houses.

Referring to FIGS. 2 and 6, the front pillar corner garnish 30 can include a plurality of connectors 76 mounted on a rear surface 78 of the front pillar corner garnish 30. FIGS. 2 and 6 schematically illustrate each of the connectors 76. Each of the connectors 76 can be any appropriate connector such as, but not limited to, a threaded fastener, a rivet, a clamp, a clip, mating snap-fitting structures, an adhesive bead, an adhesive tape, or mating hook and loop fasteners.

Figure 7:
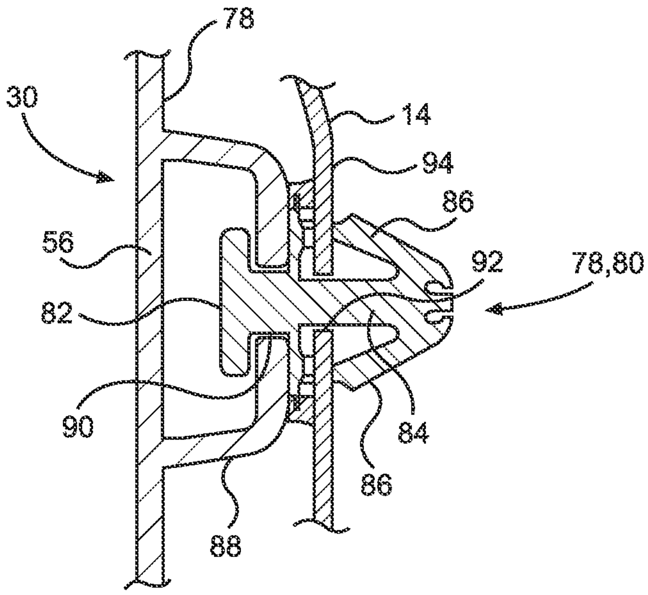
FIG. 7 is a cross-sectional view taken along line 7-7 of FIG. 2.

FIG. 7 shows an exemplary connector 76 that is configured as a clip 80. The clip 80 can include a base 82, a stem 84 and a pair of arms 86. The front pillar corner garnish 30 can include a doghouse 88 and a plurality of clip holes 90 extending through the doghouse 88.

The base 82 can be larger than the clip hole 90 and abut the doghouse 88. The stem 84 can extend through the clip hole 90 and protrude away from doghouse 88 and toward the A-pillar 14. Each of the arms 86 can be cantilevered to the stem 84. The arms 86 can be elastically deformed when the arms 86 are bent so that the free end moves toward the stem 84.

The A-pillar 14 can include a plurality of clip holes 92. The clip holes 92 can be aligned with the clip holes 90 in the doghouse 88. The stem 84 can extend through the respective one of the clip holes 92 in the A-pillar 14 and the arms 86 can be located adjacent to a surface 94 of the A-pillar 14.

The arms 86 of the clips 80 can elastically bend inwardly toward the stem 84 when the clips 80 are inserted into the respective clip holes 90, 92. The arms 86 can elastically return to the spread position shown in FIG. 7 after passing through respective clip hole 92 during installation of the front pillar corner garnish 30 onto the A-pillar 14.

The span between the elastic arms 86 can be larger than the diameter of the clip holes 92. Further, the arms 86 can bend away from the stem 84 if the front pillar corner garnish 30 moves away from the A-pillar in the transverse direction T of the vehicle 12, thereby further increasing the size of the arms 86 relative to the diameter of the clip hole 92. Thus, the arms 86 can prevent or resist retraction of the clip 80 from the respective clip hole 92.

In addition to the bolt 50, the A-pillar garnish 28 can be connected to the A-pillar 14 by one or more connectors 102 that are spaced away from the bolt 50. FIG. 2 schematically illustrates the connectors 102 in phantom. Each of the additional connectors 102 can be any appropriate connector such as, but not limited to, a threaded fastener, a rivet, a clamp, a clip, mating snap-fitting structures, an adhesive bead, an adhesive tape, or mating hook and loop fasteners.

In alternate embodiments at least one of the connectors 102 can be the same as or similar to the clip 80.

Referring to FIG. 8, the A-pillar 14 can include an inboard side 100 that is adjacent to the windshield 16. Referring to FIGS. 1, 2 and 8, the wrap-around garnish assembly 10 can include a cover panel 98. The cover panel 98 can be adjacent to the windshield 16 and the extension panel 58. The cover panel 98 can be oriented relative to the A-pillar 14 to be nearer the inboard side 100 than any other portion of the A-pillar 14. The cover panel 98 can extend away from the inboard side 100 of the A-pillar and along the windshield 16 generally along the transverse direction T of the vehicle 12. The cover panel 98 can overlap the bolt 75 along the longitudinal direction L, the Transverse direction T and the vertical direction V of the vehicle 12 so that the cover panel 98 covers or conceals the bolt 75 from view from outside of the vehicle 12. The cover panel 98 can be on the outside of the vehicle 12 as shown in FIG. 8. In alternate embodiments, the cover panel 98 can be adjacent to the inner surface of the windshield 16.

The wrap-around garnish assembly 10 can be assembled onto the vehicle 12 by fitting the A-pillar garnish 28 onto the A-pillar 14. The fitting can include providing the A-pillar garnish 28 with one or more of the connectors 102, aligning the connector(s) 102 with corresponding structure of the A-pillar 14, and aligning the bolt hole 48 of the A-pillar garnish 28 with the first bolt hole 54 in the A-pillar 14. After fitting the A-pillar garnish 28 onto the A-pillar 14, the lower end 34 of the of the A-pillar garnish 28 can be bolted to the A-pillar 14 with the bolt 50. After bolting the lower end 34, the front pillar corner garnish 30 can be fitted onto the A-pillar 14 and the A-pillar garnish 28. This can include aligning the connectors 76 (or clips 80) with the corresponding structure (the clip holes 92 when the connectors 76 are the clips 80) on the A-pillar 14 and aligning the bolt hole 72 of the front pillar corner garnish 30 with the second bolt hole 74 in the A-pillar 14. After fitting the front pillar corner garnish 30 onto the A-pillar 14 and the A-pillar garnish 28, the bolt 75 can be tightened toward the inboard side 100 of the A-pillar 14 and tightened against the flange 70.

The wrap-around garnish assembly 10 described with reference to FIGS. 1-9 can be mounted on the left side of the vehicle 12. The vehicle 12 can include a second wrap-around garnish assembly that is a mirror image of the wrap-around garnish assembly 10 and mounted on the right side of the vehicle 12.

The A-pillar garnish assembly 10 can be easily assembled onto the A-pillar 14 and can avoid one or more time-consuming or physically challenging tasks. Further, the bolted connection between the A-pillar garnish 28 and the A-pillar 14 can assist with retention of the A-pillar garnish 28 on the vehicle 12 and add additional robustness to the wrap-around garnish assembly 10.

The bolt 75 can be installed at the inboard side 100 of the A-pillar 14. This location can be easily accessed during the assembly of the wrap-around garnish assembly 10 onto the vehicle 12. Further, the cover panel 98 can cover or conceal the bolt 75 from view from outside the vehicle 12. Thus, the wrap-around garnish assembly 10 can promote a positive perception of the aesthetic appearance of the vehicle 12.

The fourth side 66 of the front pillar garnish 30 can extend continuously along both panels 56, 58. That is, the fourth side 66 can be continuous in its extent along the front fender 18. This continuity can increase sealing performance with the front fender 18 and improve wind noise performance.

Thus, the wrap-around garnish assembly 10 can improve the vehicle's assembly and design concept without adding additional parts or compromising the aesthetic appearance of the vehicle 12 with large part gaps.

While certain embodiments of the invention are described above, it should be understood that the invention can be embodied and configured in many different ways without departing from the spirit and scope of the invention.

The embodiment described with reference to FIGS. 1-9 shows extension panel 58 adjacent to and extending along the front fender 18. In alternate embodiments, the hood 20 can be larger in the transverse direction T of the vehicle 12 such that the hood extends between the front fender 18 and the A-pillar garnish 28. As a result, the extension panel 58 can be adjacent to and extend along the hood 20 and the fourth side 66 can extend along the front fender 18 and the hood 20.

In an alternative embodiment, the A-pillar garnish assembly disclosed herein can be modified for use with any typical metal side panel outer SPO in addition to or in place of at the A-pillar 14. There is also the possibility that a garnish assembly as disclosed herein can be modified for use at a typical side panel outer SPO in which an assembled garnish is placed along the side of the glass (typically applied for water management).

FIG. 1 is a perspective view of an exemplary vehicle 12 configured as a sport-utility vehicle or a cross-over vehicle. However, alternate embodiments of the vehicle 12 can include any type of vehicle, including a passenger car, minivan, truck, all-terrain vehicle (ATV), semi-tractor, off-highway vehicle, aircraft, watercraft, etc.

The vehicle 12 can have two of the doors 22—one on each side of the vehicle. Alternate embodiments of the vehicle 12 can have four or more doors and the door 22 can be referred to as a front door.

In alternate embodiments, the side panel 56 can be connected to a side mirror and can mount the side mirror onto the vehicle 12.

Any of the connection structures, such as bolts 50, 75, can be replaced with alternative connection structures such as groove and slot connections, rivets, welds, adhesives, and the like. For example, the bolt 50 can be replaced with a clip molded into the A-pillar garnish 28 that mates with a corresponding structure on the body of the vehicle, or can be a factory member assembled clip.

What is claimed is:

1. A vehicle extending in a longitudinal direction, a transverse direction, and a vertical direction, the transverse direction is orthogonal to the longitudinal direction, and the vertical direction is orthogonal to each of the longitudinal direction and the transverse direction, the vehicle comprising:

a windshield inclined relative to the longitudinal direction and the vertical direction, the windshield includes an upper side that extends along the transverse direction;

an A-pillar adjacent to the windshield and inclined relative to the longitudinal direction and the vertical direction;

a body panel adjacent to the A-pillar, the body panel extends away from the A-pillar in the longitudinal direction;

an A-pillar garnish mounted onto and covering at least a portion of the A-pillar and including a lower end that is adjacent to the body panel, the A-pillar garnish includes:

an upper side adjacent to the upper side of the windshield;

a lower side adjacent to the front pillar corner garnish and spaced away from the upper side of the A-pillar garnish in the longitudinal direction and the vertical direction;

a first side extending along the windshield from the upper side of the A-pillar garnish to the lower side; and a second side spaced away from the first side and extending from the upper side of the A-pillar garnish to the lower side;

a front pillar corner garnish covering at least a portion of the lower end and extending from the second side of A-pillar at a location on the second side of the A-pillar garnish that is spaced away from the upper side of the A-pillar garnish and the lower side of the A-pillar garnish, the front pillar corner garnish extends away from the second side of the A-pillar garnish along the longitudinal direction and the vertical direction; and a first connection structure connecting the front pillar corner garnish to the A-pillar.

2. The vehicle according to claim 1, wherein the front pillar corner garnish includes:

a side panel extending from the A-pillar garnish to the body panel along the vertical direction and extending away from the A-pillar garnish in the longitudinal direction, the side panel includes:

a first side extending away from the second side of the A-pillar garnish along the vertical direction at a location spaced away from each of the upper side of the A-pillar garnish and the lower side; and a second side extending away from the first side of the side panel and along the second side of the A-pillar garnish; and an extension panel extending from the side panel to the windshield, the extension panel covers the lower end of the A-pillar garnish, the extension panel includes a third side extending away from the second side of the side panel and along the lower side of the A-pillar garnish.

3. The vehicle according to claim 2, wherein the A-pillar garnish includes a first exterior surface, the lower end includes a mounting member that protrudes from the lower side and is recessed inwardly from the first exterior surface, the first exterior surface ends at the lower end side and is spaced away from the body panel by a gap, and the extension panel covers the gap and the mounting member and includes a second exterior surface that is flush with the first exterior surface.

4. The vehicle according to claim 3, further comprising:

a second connection structure passing through the mounting member and connecting the mounting member to the A-pillar, wherein the extension panel of the front pillar corner garnish covers the second connection structure.

5. The vehicle according to claim 4, further comprising:

a plurality of clips connecting the side panel to the A-pillar.

6. The vehicle according to claim 2, wherein the A-pillar garnish is between the side panel and the windshield, the extension panel includes an end that is adjacent to the windshield, and the first connection structure includes a bolt that passes through the end.

7. The vehicle according to claim 6, further comprising:

a cover panel extending along the windshield and covering the first connection structure.

8. The vehicle according to claim 2, wherein the front pillar corner garnish includes a lower fourth side that extends along the side panel and the extension panel, and the lower side is adjacent to and extends along the body panel from the first side of the side panel to the fourth side of the extension panel; and the extension panel includes a fifth side that extends along the windshield and away from the third side of the extension panel, the fifth side ends at the body panel.

9. The vehicle according to claim 1, wherein the body panel is a fender and the fender includes a wheel arch.

10. A method for assembling the vehicle of claim 1, the method comprising:

fitting the A-pillar garnish onto the A-pillar;

bolting the lower end of the A-pillar garnish to the A-pillar;

fitting the front pillar corner garnish onto the A-pillar and the A-pillar garnish; and fastening the first connection structure from a side of the A-pillar that is adjacent to the windshield.

11. The method according to claim 10, wherein the fitting the front pillar corner garnish includes inserting a plurality of clips that are mounted onto the front pillar corner garnish into a plurality of clip holes in the A-pillar.

12. A vehicle extending in a longitudinal direction, a transverse direction, and a vertical direction, the transverse direction is orthogonal to the longitudinal direction, and the vertical direction is orthogonal to each of the longitudinal direction and the transverse direction, the vehicle comprising:

an A-pillar that is inclined relative to the longitudinal direction and the vertical direction;

a windshield mounted onto the A-pillar and inclined relative to the longitudinal direction and the vertical direction, the windshield extends along the transverse direction;

a door pivotally mounted onto the A-pillar;

a body panel adjacent to the A-pillar, the body panel extends away from the A-pillar in the longitudinal direction;

an A-pillar garnish mounted onto and covering at least a portion of the A-pillar and including:

an upper side that is adjacent to the upper side of the windshield;

a lower end that is adjacent to the body panel, the lower end includes a lower side that is spaced away from the upper side in the longitudinal direction and the vertical direction;

a first side that extends along the windshield from the upper side of the A-pillar garnish to the lower side; and a second side that is spaced away from the first side and extends from the upper side of the A-pillar garnish to the lower side;

a front pillar corner garnish covering at least a portion of the lower end, the front pillar corner garnish includes:

a first side that extends away from the second side of the A-pillar garnish along the vertical direction, the first side extends from a location on the second side of the A-pillar garnish that is spaced away from each of the upper side of the A-pillar garnish and the lower side;

a second side that extends away from the first side of the front pillar corner garnish and along the second side of the A-pillar garnish;

a third side that extends away from the second side of the front pillar corner garnish and along the lower side of the A-pillar garnish;

a fourth side that extends from the first side of the front pillar corner garnish along the longitudinal direction, the fourth side is spaced away from the lower side of the A-pillar garnish in the longitudinal direction and the vertical direction, the fourth side extends along the body panel; and a fifth side that extends along the windshield from the third side to the fourth side; and a first connection structure connecting the front pillar corner garnish to the A-pillar.

13. The vehicle according to claim 12, wherein the A-pillar includes an inboard side that is adjacent to the windshield, and the first connection structure extends through the inboard side, and the vehicle further comprising:

a cover panel extending along the windshield and covering the first connection structure.

14. The vehicle according to claim 12, further comprising:

a second connection structure passing through the lower end of the A-pillar garnish and connecting the A-pillar garnish to the A-pillar; and a plurality of clips connecting the front pillar corner garnish to the A-pillar.

15. The vehicle according to claim 14, wherein the A-pillar includes an exterior surface that is spaced away from the body panel by a gap, and the front pillar corner garnish includes:

a side panel that is located between the door and the A-pillar garnish in a longitudinal direction of the vehicle, the side panel extends along the body panel in the longitudinal direction, the side panel includes the first side of the front pillar corner garnish, the second side of the front pillar corner garnish, and a portion of the fourth side, and an extension panel extending from the side panel to the windshield along a transverse direction of the vehicle, the extension panel covers the second connection structure, the gap, and the lower end of the A-pillar garnish, and extends along the body panel in the transverse direction, the extension panel includes the third side, a portion of the fourth side, and the fifth side.

16. A vehicle extending in a longitudinal direction, a transverse direction, and a vertical direction, the transverse direction is orthogonal to the longitudinal direction, and the vertical direction is orthogonal to each of the longitudinal direction and the transverse direction, the vehicle comprising:

an A-pillar that is inclined relative to the longitudinal direction and the vertical direction, the A-pillar includes an inboard side;

a windshield adjacent the inboard side of the A-pillar and inclined relative to the longitudinal direction and the vertical direction, the windshield extends along the transverse direction;

a body panel adjacent to the A-pillar, the body panel extends away from the A-pillar in the longitudinal direction;

an A-pillar garnish mounted onto and covering at least a portion of the A-pillar, the A-pillar garnish includes a main body and a mounting member protruding from the main body, the main body includes:

an upper side that is adjacent to the upper side of the windshield;

a lower side that is spaced away from the upper side in the longitudinal direction and the vertical direction;

a first side that extends along the windshield from the upper side of the A-pillar garnish to the lower side;

a second side that is spaced away from the first side and extends from the upper side of the A-pillar garnish to the lower side; and a first exterior surface that is spaced away from the body panel by a gap, the mounting member is recessed inwardly from the first exterior surface, the exterior surface is bound by the first side, the second side, the upper side, and the lower side;

a front pillar corner garnish covering the gap and at least a portion of the mounting member, the front pillar corner garnish includes:

a first side that extends away from the second side of the A-pillar garnish along the vertical direction, the first side extends from a location on the second side of the A-pillar garnish that is spaced away from each of the upper side of the A-pillar garnish and the lower side;

a second side that extends away from the first side of the front pillar corner garnish and along the second side of the A-pillar garnish;

a third side that extends away from the second side of the front pillar corner garnish and along the lower side of the A-pillar garnish;

a fourth side that extends from the first side of the front pillar corner garnish along the longitudinal direction, the fourth side is spaced away from the lower side in the longitudinal direction and the vertical direction, the fourth side extends along the body panel;

a fifth side that extends along the windshield from the third side to the fourth side; and a second exterior surface that is flush with the first exterior surface, the second exterior surface is bound by the first side of the front pillar corner garnish, the second side of the front pillar corner garnish, the third side, the fourth side and the fifth side; and a first connection structure connecting the front pillar corner garnish to the A-pillar and extending through the inboard side of the A-pillar.

17. The vehicle according to claim 16, further comprising:

a cover panel extending along the windshield and covering at least a portion of the first connection structure.

18. The vehicle according to claim 16, further comprising:

a second connection structure that extends through the mounting member and connects the A-pillar garnish to the A-pillar.

19. The vehicle according to claim 18, wherein the front pillar corner garnish includes:

a side panel that includes the first side of the front pillar corner garnish, the second side of the front pillar corner garnish, a portion of the fourth side, and a portion of the second exterior surface, an extension panel extending from the side panel to the windshield, the extension panel covers the second connection structure and the mounting member of the A-pillar garnish and extends along the body panel, and the first connection structure extends through the extension panel.

20. The vehicle according to claim 19, further comprising:

a plurality of clips mounted onto the side panel and connected to the A-pillar.

* * * * *